(12) United States Patent
Sadamura

(10) Patent No.: US 11,643,078 B2
(45) Date of Patent: May 9, 2023

(54) TRAVEL CONTROL DEVICE FOR VEHICLE

(71) Applicant: HONDA MOTOR CO., LTD., Tokyo (JP)

(72) Inventor: Satoshi Sadamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/206,841

(22) Filed: Mar. 19, 2021

(65) Prior Publication Data

US 2021/0300364 A1 Sep. 30, 2021

(30) Foreign Application Priority Data

Mar. 26, 2020 (JP) .............................. JP2020-056790

(51) Int. Cl.
*B60W 30/12* (2020.01)
*B60W 30/14* (2006.01)
(Continued)

(52) U.S. Cl.
CPC ............ *B60W 30/12* (2013.01); *B60W 10/20* (2013.01); *B60W 30/146* (2013.01);
(Continued)

(58) Field of Classification Search
CPC .... B60N 2/6673; B60N 2/919; B60N 2/0244; B60N 2/0276; B60N 2/0224; B60N 2/22;
(Continued)

(56) References Cited

U.S. PATENT DOCUMENTS 6,526,352 B1 * 2/2003 Breed ................... G01S 19/071
701/470
10,227,039 B1 * 3/2019 Prasad ............ B60W 30/18145
(Continued)

FOREIGN PATENT DOCUMENTS

| EP | 1764277 A1 * | 3/2007 | .......... B60W 30/146 |
| JP | 2018024360 A * | 2/2018 | |
| WO | WO-2015187076 A1 * | 12/2015 | ......... B60K 31/0083 |
| WO | WO-2019043832 A1 * | 3/2019 | ............. B60R 21/00 |

OTHER PUBLICATIONS

EP-1764277-A1 translation (Year: 2007).*
JP-2018024360-A translation (Year: 2018).*
WO-2019043832-A1 translation (Year: 2019).*

*Primary Examiner* — Jeff A Burke
*Assistant Examiner* — Kyle T Johnson
(74) *Attorney, Agent, or Firm* — Armstrong Teasdale LLP

(57) ABSTRACT

A travel control device for a vehicle, includes: a lane information acquisition unit configured to acquire lane information; a steering control unit configured to control steering of the vehicle by executing lane travel control to make the vehicle travel along the lane; and a vehicle speed control unit configured to control a vehicle speed by executing constant speed travel control in which the vehicle is made to travel at a set vehicle speed and/or adaptive cruise control in which the vehicle is made to travel at a speed equal to or lower than the set vehicle speed so as to follow a preceding vehicle. The vehicle speed control unit is configured to control the vehicle speed during a turn of the vehicle by setting a vehicle speed upper limit value, which is set to different values depending on whether the lane travel control is being executed.

5 Claims, 12 Drawing Sheets

(51) Int. Cl.
*B60W 30/165* (2020.01)
*B60W 40/072* (2012.01)
*B60W 40/105* (2012.01)
*B60W 50/00* (2006.01)
*B60W 10/20* (2006.01)
*B60W 40/109* (2012.01)
*G06V 20/56* (2022.01)

(52) U.S. Cl.
CPC ........ *B60W 30/165* (2013.01); *B60W 40/072* (2013.01); *B60W 40/105* (2013.01); *B60W 40/109* (2013.01); *B60W 50/0097* (2013.01); *G06V 20/588* (2022.01); *B60W 2520/125* (2013.01); *B60W 2552/53* (2020.02)

(58) Field of Classification Search
CPC .......... B60N 2/42745; B60W 50/0098; B60W 60/0059; B60W 2040/0818; B60R 16/02; G05D 1/0061; G05D 3/00
See application file for complete search history.

(56) References Cited

U.S. PATENT DOCUMENTS

| | | | |
|---|---|---|---|
| 11,260,860 B2* | 3/2022 | Hosokawa | B60W 50/085 |
| 2008/0046150 A1* | 2/2008 | Breed | B60R 21/0134 |
| | | | 701/45 |
| 2008/0059037 A1* | 3/2008 | Isaji | B60W 40/072 |
| | | | 701/93 |
| 2008/0133092 A1* | 6/2008 | Hozumi | B60N 2/99 |
| | | | 701/49 |
| 2016/0016663 A1* | 1/2016 | Stanek | G05D 1/0276 |
| | | | 701/3 |
| 2017/0297566 A1* | 10/2017 | Matsumura | B60W 60/0017 |
| 2017/0334454 A1* | 11/2017 | Abe | B60W 30/143 |
| 2018/0037235 A1* | 2/2018 | Otake | B60W 30/12 |
| 2018/0093709 A1* | 4/2018 | Oguro | B60W 30/12 |
| 2019/0031191 A1* | 1/2019 | Satoh | B60W 30/18145 |
| 2019/0210591 A1* | 7/2019 | Low | B60W 50/085 |
| 2020/0180617 A1* | 6/2020 | Tezuka | B60W 30/14 |
| 2021/0300364 A1* | 9/2021 | Sadamura | B60W 40/072 |

* cited by examiner

TRAVEL CONTROL DEVICE FOR VEHICLE

TECHNICAL FIELD

The present disclosure relates to a travel control device for vehicle for controlling steering and a vehicle speed of the vehicle.

BACKGROUND ART

In a vehicle control device for executing adaptive cruise control to follow a preceding vehicle, the lateral acceleration of the own vehicle may be controlled to be in a prescribed tolerable range for safe travel of the vehicle. Specifically, when the lateral acceleration reaches the upper limit of the tolerable range, control is performed to limit the vehicle speed. Thus, if the speed limit is executed during the following travel, the speed of the own vehicle may be controlled to be lower than the speed of the preceding vehicle so that the inter-vehicle distance between the own vehicle and the preceding vehicle becomes gradually larger, and this may give discomfort to the driver. To avoid this, it has been proposed to provide a vehicle control device configured to allow a larger increase in the lateral acceleration in a curved lane when the vehicle is traveling following the preceding vehicle than when the vehicle is not following the preceding vehicle (see JP2018-024360A).

In the vehicle control device described in JP2018-024360A, when the vehicle is traveling following the preceding vehicle, an increase in the lateral acceleration in an increasing curvature section of a curved lane is allowed so long as the preceding vehicle is recognized. However, when the vehicle speed is controlled by adaptive cruise control to follow the preceding vehicle, there are two cases where lane travel control (such as lane keeping assist control) for controlling the trajectory (steering) of the own vehicle such that the vehicle travel along the lane is executed and where the lane travel control is not executed (namely, only the vehicle speed is controlled). The driver may have different feelings from the behavior of the vehicle during a turn depending on whether the lane travel control is being executed or not. Thus, there is room for improving the vehicle speed control during a turn of the vehicle by taking into account whether the lane travel control is being executed during the turn.

SUMMARY OF THE INVENTION

In view of such background, an object of the present invention is to provide a travel control device for a vehicle which can execute proper vehicle speed control during a turn of the vehicle in accordance with whether the lane travel control is being executed.

Means to Accomplish the Task

To achieve such an object, one embodiment of the present invention provides a travel control device (1) for a vehicle, comprising: a lane information acquisition unit (31) configured to acquire lane information which is information of a lane on which the vehicle is traveling; a steering control unit (32) configured to control steering of the vehicle by executing lane travel control (LKAS, RDM) to make the vehicle travel along the lane; and a vehicle speed control unit (33) configured to control a vehicle speed (V) by executing constant speed travel control (CC) in which the vehicle is made to travel at a set vehicle speed (Vs) and/or adaptive cruise control (ACC) in which the vehicle is made to travel at a speed equal to or lower than the set vehicle speed so as to follow a preceding vehicle, wherein the vehicle speed control unit is configured to control the vehicle speed during a turn of the vehicle by setting a vehicle speed upper limit value (Vm), and the vehicle speed upper limit value is set to different values depending on whether the lane travel control is being executed.

According to this configuration, the vehicle speed upper limit value during a turn of the vehicle is set to different values depending on whether the lane travel control is executed, and therefore, it is possible to execute proper vehicle speed control during a turn of the vehicle in accordance with whether the lane travel control is being executed.

Preferably, when the lane travel control (LKAS, RDM) is being executed, the vehicle speed control unit (33) sets the vehicle speed upper limit value (Vm) to be lower than when the lane travel control is not being executed.

According to this configuration, the ability to follow (or keep) the lane can be improved when the lane travel control is being executed by the steering control unit. Therefore, the uneasiness that may be felt by the driver on the turning performed by the lane travel control can be suppressed. When the driver performs the steering operation, an increase in the distance to the preceding vehicle due to the limitation of the vehicle speed can be suppressed, namely, the ability to follow the preceding vehicle provided by the vehicle speed control executed by the vehicle speed control unit can be enhanced, so that the driver's comfort can be improved.

Preferably, the lane information acquisition unit (31) is configured to acquire a curvature of the lane, the vehicle speed control unit (33) is configured to determine the vehicle speed upper limit value (Vm) based on a prescribed lateral acceleration limit value (Gm1, Gm2), and the lateral acceleration limit value is set to a larger value as the curvature of the lane becomes larger.

According to this configuration, the vehicle speed upper limit value is set based on the lateral acceleration limit value that increases as the curvature of the lane acquired by the lane information acquisition unit becomes larger. Therefore, it is possible to make the vehicle turn without excessively lowering the vehicle speed when the lane travel control is being executed by the steering control unit. Therefore, comfortable and highly convenient vehicle speed control can be performed within the range tolerable to the occupant.

Preferably, when the lane travel control (LKAS, RDM) is being executed, the vehicle speed control unit (33) sets the lateral acceleration limit value (Gm1, Gm2) to be smaller than when the lane travel control is not being executed.

According to this configuration, the ability to follow the lane can be improved. Therefore, the occupant can feel easy when the vehicle turns under the lane travel control. When the driver performs the steering operation, an increase in the distance to the preceding vehicle due to the limitation of the vehicle speed can be suppressed, namely, the ability to follow the preceding vehicle provided by the vehicle speed control executed by the vehicle speed control unit can be enhanced.

Preferably, in a case where the curvature of the lane is larger than a prescribed curvature, the vehicle speed control unit (33) sets the lateral acceleration limit value (Gm2) when the lane travel control (LKAS, RDM) is being executed to a value smaller than the lateral acceleration limit value (Gm1) when the lane travel control is not being executed.

According to this configuration, in the case where the curvature of the lane is larger than the prescribed curvature, the lateral acceleration limit value when the lane travel control is being executed is set to be small, whereby the uneasiness that may be felt by the occupant can be suppressed.

Preferably, the vehicle speed control unit (33) sets the lateral acceleration limit value (Gm2) when the lane travel control (LKAS, RDM) is being executed to a value smaller than or equal to 3 m/s$^2$.

According to this configuration, the lateral acceleration during execution of the lane travel control, in which attention of the occupant on the steering operation is relatively low, is maintained not to exceed 3 m/s$^2$, whereby it is ensured that uneasiness of the occupant caused by the lateral acceleration can be suppressed.

Preferably, in a case where the curvature of the lane is smaller than or equal to a prescribed curvature, the vehicle speed control unit (33) sets the lateral acceleration limit value (Gm2) when the lane travel control (LKAS, RDM) is being executed to a value same as the lateral acceleration limit value (Gm1) when the lane travel control is not being executed.

According to this configuration, in the case where the curvature is smaller than or equal to the prescribed curvature, it is possible to prevent the vehicle speed from being lowered excessively, which would deteriorate the convenience and comfort of the vehicle speed control.

Preferably, the lane information acquisition unit (31) is configured to acquire the curvature of the lane from a current position of the vehicle on the lane to a future position where the vehicle will travel in future, and the vehicle speed control unit (33) is configured to limit fluctuation of the vehicle speed upper limit value (Vm) based on the curvature of the lane at the future position.

According to this configuration, by limiting the fluctuation of the vehicle speed upper limit value based on the curvature at the future position, frequent fluctuation of the vehicle speed upper limit value can be suppressed. Thereby, the discomfort that may be felt by the occupant can be suppressed, which improves the marketability of the vehicle equipped with the travel control device.

Preferably, in a case where the lane travel control (LKAS, RDM) that has been executed is stopped while the vehicle is traveling in an increasing curvature section of the lane in which the curvature at the future position is larger than the curvature at the current position, the vehicle speed control unit (33) limits an increase in the vehicle speed upper limit value (Vm) due to stop of the lane travel control.

According to this configuration, since the vehicle speed control unit limits the increase in the vehicle speed upper limit value (and hence, increase in the vehicle speed) in the above situation, undesired acceleration of the vehicle before deceleration is prevented, whereby the marketability of the vehicle can be improved.

Preferably, in a case where the lane travel control (LKAS, RDM) that has been stopped is started while the vehicle is traveling in a decreasing curvature section of the lane in which the curvature at the future position is smaller than the curvature at the current position, the vehicle speed control unit (33) limits a decrease in the vehicle speed upper limit value (Vm) due to start of the lane travel control.

According to this configuration, since the vehicle speed control unit limits the decrease in the vehicle speed upper limit value (and hence, decrease in the vehicle speed) in the above situation, undesired deceleration of the vehicle before acceleration is prevented, whereby the marketability of the vehicle can be improved.

Preferably, when the lane travel control (LKAS, RDM) is being executed, the vehicle speed control unit (33) sets the vehicle speed upper limit value (Vm) to be higher than when the lane travel control is not being executed.

According to this configuration, it is possible to improve the ability to follow the preceding vehicle when the lane travel control is being executed. Also, when the driver performs the steering operation, the vehicle speed is limited by a lower vehicle speed upper limit value compared to when the lane travel control is being executed by the steering control unit, whereby burden on the driver for performing the steering operation is reduced.

Thus, according to the present invention, it is possible to provide a travel control device for a vehicle which can execute proper vehicle speed control during a turn of the vehicle in accordance with whether the lane travel control is being executed.

DESCRIPTION OF THE PREFERRED EMBODIMENT(S)

In the following, an embodiment of a travel control device 1 according to the present invention will be described with reference to the drawings.

Figure 1:
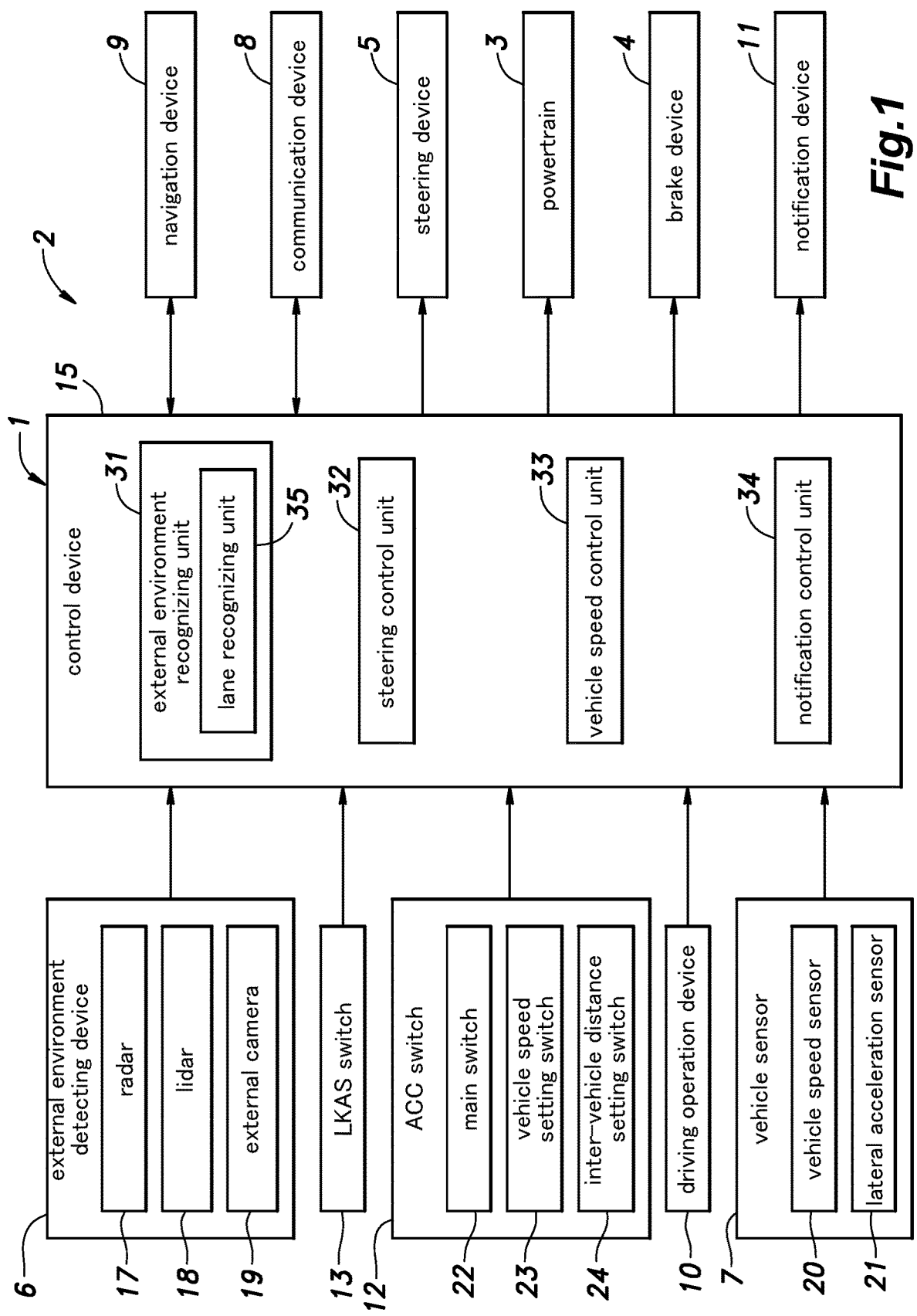
FIG. 1 is a functional configuration diagram of a vehicle in which a travel control device according to an embodiment of the present invention is installed.

As shown in FIG. 1, the travel control device 1 is installed in a vehicle consisting of a four-wheel automobile and constitutes a part of a vehicle system 2. The vehicle system 2 includes a powertrain 3, a brake device 4, a steering device 5, an external environment detecting device 6, a vehicle sensor 7, a communication device 8, a navigation device 9 (map device), a driving operation device 10, a notification device 11, an ACC switch 12, an LKAS switch 13, and a control device 15. The above components of the vehicle system 2 are connected to each other so that signals can be transmitted therebetween via communication means such as a Controller Area Network (CAN). In the present embodiment, the control device 15 embodies the travel control device 1.

The powertrain 3 is a device configured to apply a driving force to the vehicle. The powertrain 3 includes a power source and a transmission, for example. The power source includes at least one of an internal combustion engine, such as a gasoline engine and a diesel engine, and an electric motor. The brake device 4 is a device configured to apply a brake force to the vehicle. For example, the brake device 4 includes a brake caliper configured to press a brake pad against a brake rotor and an electric cylinder configured to supply an oil pressure to the brake caliper. The steering device 5 is a device for changing a steering angle of the wheels. For example, the steering device 5 includes a rack-and-pinion mechanism configured to steer (turn) the wheels and an electric motor configured to drive the rack-and-pinion mechanism. The powertrain 3, the brake device 4, and the steering device 5 are controlled by the control device 15.

The external environment detecting device 6 is a device for detecting objects outside the vehicle and the like. The external environment detecting device 6 includes sensors for detecting electromagnetic waves such as visible light from the surroundings of the vehicle to detect objects outside the vehicle and the like. Such sensors may include, for example, one or more radars 17, one or more lidars 18, and one or more external cameras 19. Besides, the external environment detecting device 6 may include a device configured to receive signals from outside the vehicle and to detect objects outside the vehicle based on the received signals. The external environment detecting device 6 outputs a detection result to the control device 15.

Each radar 17 emits radio waves such as millimeter waves to the surroundings of the vehicle and captures the radio waves reflected by an object around the vehicle thereby to detect the position (distance and direction) of the object. Each radar 17 may be mounted at any suitable position on the vehicle. The one or more radars 17 include at least a front radar configured to emit radio waves in the forward direction of the vehicle. Each lidar 18 emits light such as infrared light to the surroundings of the vehicle and captures the light reflected by an object around the vehicle thereby to detect the position (distance and direction) of the object. Each lidar 18 may be mounted at any suitable position on the vehicle.

The one or more external cameras 19 are arranged to capture images of the surroundings of the vehicle to detect objects around the vehicle, for example, nearby vehicles and pedestrians, guardrails, curbs, walls, median strips, and road markings used on the road surface to convey various information such as lane boundaries and road shapes. Each external camera 19 may consist of a digital camera using a solid imaging element such as a CCD or a CMOS, for example. Each external camera 19 may be mounted at any suitable position on the vehicle. The one or more external cameras 19 include at least a front camera for capturing images in front of the vehicle. Preferably, the one or more external cameras 19 further include a rear camera configured to capture images behind the vehicle and a pair of side cameras configured to capture images on left and right sides of the vehicle. Each external camera 19 may be a stereo camera, for example.

The vehicle sensor 7 includes a vehicle speed sensor 20 configured to detect the speed of the vehicle, a lateral acceleration sensor 21 configured to detect the lateral acceleration G of the vehicle, a yaw rate sensor (not shown) configured to detect the angular velocity around a vertical axis of the vehicle, and a direction sensor (not shown) configured to detect the direction of the vehicle.

The communication device 8 enables the control device 15 to communicate with the navigation device 9, vehicles present around the own vehicle, and/or an outside server. The control device 15 can communicate wirelessly with the vehicles around the own vehicle via the communication device 8. Further, the control device 15 can communicate with a server providing map information, traffic control information and the like via the communication device 8.

The navigation device 9 is a device configured to obtain a current position of the vehicle and provides route guidance to a destination and the like while displaying the current position on the map. The navigation device 9 includes a GNSS receiving unit, a map storage unit, a navigation interface, a route determination unit, and the like. The GNSS receiving unit identifies the position (latitude and longitude) of the vehicle based on a signal received from an artificial satellite (positioning satellite). The map storage unit consists of a known storage device such as a flash memory or a hard disk, and stores map information.

The map information preferably contains types of roads such as expressways, toll roads, national highways, and prefectural roads, the number of lanes in each road, the center position of each lane (three-dimensional coordinate including a longitude, a latitude, and a height), and lane shape information including the width, curvature (radius of curvature R), and the like of each lane. Note that the map storage unit may be configured as a part of the control device 15 or a part of a server device that can be communicated with via the communication device 8. Also, the map information may contain the traffic control information, traffic congestion information, and the like acquired via the communication device 8. Here, the curvature represents the degree of the curve and, for example, the smaller the radius of curvature of a curved lane is, the larger the curvature of the lane is.

The driving operation device 10 is configured to receive an input operation performed by the driver to control the vehicle. The driving operation device 10 includes, for example, a steering wheel, an accelerator pedal, and a brake pedal. The driving operation device 10 may further include a shift lever, a parking brake lever, and the like. Each of these operation members included in the driving operation device 10 is provided with a sensor for detecting an operation amount thereof. The driving operation device 10 outputs signals indicating the operation amounts of the respective operation members to the control device 15.

The notification device 11 is configured to notify a vehicle occupant (such as the driver) of various kinds of information by display and/or voice. The notification device 11 includes, for example, a touch panel display, a speaker, and the like. In another embodiment, the notification device 11 may be configured as a part of the navigation device 9.

The ACC switch 12 is a switch configured to receive instructions regarding automated driving that relate to a vehicle speed V from the occupant, and includes a main switch 22, a vehicle speed setting switch 23, and an inter-vehicle distance setting switch 24. The main switch 22 is configured to receive an instruction to start or stop adaptive cruise control (ACC) from the occupant. In the adaptive cruise control, the vehicle (the own vehicle) is controlled to travel at a speed equal to or lower than a set vehicle speed Vs so as to follow a preceding vehicle which is traveling ahead of the own vehicle in the same lane. The vehicle speed setting switch 23 is configured to receive an input of the set vehicle speed Vs from the occupant. The set vehicle speed Vs serves as an upper limit value of the vehicle speed V during the adaptive cruise control. The inter-vehicle distance setting switch 24 is configured to receive an input of a set inter-vehicle distance Ds from the occupant. The set inter-vehicle distance Ds is a minimum inter-vehicle distance between the own vehicle and the preceding vehicle during the adaptive cruise control.

The LKAS switch 13 is a switch configured to receive instructions regarding automated driving that relates to steering of the vehicle from the occupant, and specifically is configured to receive an instruction to activate (start) or stop a lane keeping assist system (LKAS) from the occupant. The LKAS, when activated, executes lane travel control to make the vehicle travel along the lane.

The ACC switch 12 and the LKAS switch 13 may each consist of a mechanical switch or a graphical user interface (GUI) switch displayed on the touch panel, and are disposed at appropriate positions in the vehicle cabin. The ACC switch 12 may be configured as part of the input interface of the notification device 11 or the navigation interface.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware.

The control device 15 includes an external environment recognizing unit 31, a steering control unit 32, a vehicle speed control unit 33, and a notification control unit 34. The external environment recognizing unit 31 includes a lane recognizing unit 35. The external environment recognizing unit 31 recognizes, based on the detection result of the external environment detecting device 6, obstacles around the vehicle, road shape, presence or absence of a sidewalk, road markings, and the like. Particularly, the lane recognizing unit 35 of the external environment recognizing unit 31 recognizes the lane on which the vehicle is traveling from the images captured by the external camera 19 or the like and acquires the lane information indicating the shape of the recognized lane. The steering control unit 32 controls the steering of the vehicle via the steering device 5 so as to execute lane keeping assist control. The vehicle speed control unit 33 controls the vehicle speed V via the powertrain 3 and the brake device 4 so as to execute the adaptive cruise control. The notification control unit 34 controls notification operation of the notification device 11.

The control device 15 executes at least Level 1 automated driving control (hereinafter may be simply referred to as automated driving) by combining various kinds of vehicle control including the lane keeping assist control and the adaptive cruise control. The automated driving levels are based on the definition of SAE J3016 (trademark), and are defined in relation to the degree of the driver's intervention to the driving operations and the vehicle surroundings monitoring.

In Level 0 automated driving (namely, manual driving), the control device 15 does not control the vehicle, and the driver performs all driving operations. Namely, the powertrain 3, the brake device 4, the steering device 5, and the like are operated according to the input of the driver to the driving operation device 10. Note that in the manual driving also, the drive control of the powertrain 3 according to the pressing amount of the accelerator pedal and the drive control of the steering device 5 to generate a steering assist force according to the input torque to the steering wheel (steering torque) are performed by the control device 15.

In Level 1 automated driving, the control device 15 performs part of the driving operations, and the driver performs the remaining driving operations. For example, Level 1 automated driving includes constant speed travel control, adaptive cruise control (ACC), and lane keeping assist control (LKAS). Namely, in Level 1 automated driving, the control device 15 executes steering, acceleration, and deceleration of the vehicle.

In the present embodiment, when an instruction to execute the adaptive cruise control is received via the ACC switch 12, the vehicle speed control unit 33 executes the adaptive cruise control to control the vehicle speed V such that the vehicle travels at a speed equal to or lower than the set vehicle speed Vs so as to follow the preceding vehicle.

In another embodiment, instead of or together with the ACC switch 12, a cruise control (CC) switch may be provided so that upon receipt of a cruise control execution instruction, the vehicle speed control unit 33 executes the constant speed travel control to control the vehicle speed V such that the vehicle travels at the set vehicle speed Vs. The adaptive cruise control and the constant speed travel control are each vehicle speed control that adaptively controls the vehicle speed V in accordance with the lane information. The vehicle speed control unit 33 may have any configuration so long as it can execute such adaptive vehicle speed control.

Here, the lane information includes information regarding the shape of the lane on which the vehicle is traveling (which may be referred to as an own lane or a travel lane hereinafter), such as whether the lane is straight or curved and the curvature of the lane at each of multiple points on the lane ahead of the vehicle. A straight lane is, for example, a lane having a radius of curvature R larger than or equal to 2000 m, while a curved lane is, for example, a lane having a radius of curvature R smaller than 2000 m. "Each point on the lane" refers to each of the current position of the vehicle, a future position where the vehicle will travel in the future (a prescribed time later, for example), and multiple positions therebetween. In the present embodiment, the future position is a position where the vehicle will travel 10 seconds later. In another embodiment, the future position may be a position where the vehicle will travel two seconds later, a position at a prescribed distance ahead of the own vehicle (for example, 200 m ahead) or the like.

In the present embodiment, when an instruction to execute the lane keeping assist control is received via the LKAS switch 13, the steering control unit 32 executes the lane keeping control to control the steering of the vehicle via the steering device 5 such that the vehicle travels along the lane (own lane) recognized by the external environment recognizing unit 31. The lane recognized by the external environment recognizing unit 31 may be the lane recognized by the lane recognizing unit 35 from the forward images captured by the external camera 19. Alternatively or in addition, the external environment recognizing unit 31 may acquire the information of the own lane from the navigation device 9 or from outside the vehicle via the communication device 8.

In another embodiment, instead of or together with the LKAS switch 13, a road departure mitigation (RDM) switch may be provided such that when an RDM execution instruction is received via the RDM switch, the steering control unit 32 executes the road departure mitigation control to control the steering of the vehicle via the steering device 5 such that the vehicle is prevented from leaving the road (or lane). The steering control unit 32 is only required to execute at least one of the lane keeping assist control or the road departure mitigation control, each of which controls the steering of the vehicle, as the lane travel control.

Figure 2:
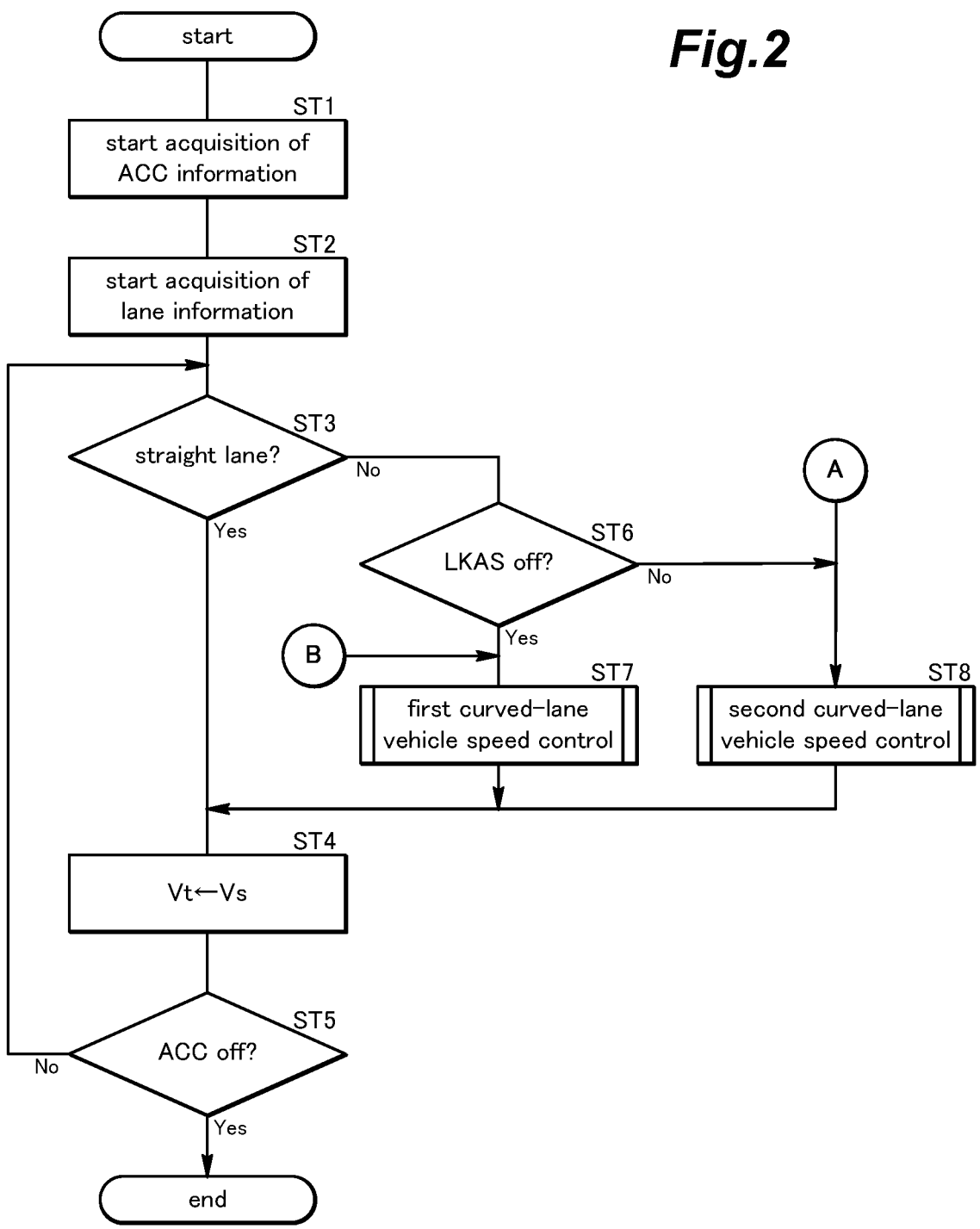
FIG. 2 is a flowchart of vehicle speed control executed by the travel control device according to the embodiment.

Next, the procedure of the vehicle speed control executed by the vehicle speed control unit 33 of the control device 15 will be described with reference to FIG. 2. Upon receipt of the instruction to execute the adaptive cruise control from the ACC switch 12, the vehicle speed control unit 33 starts the vehicle speed control shown in FIG. 2.

First, the vehicle speed control unit 33 starts acquisition of ACC information (step ST1). The ACC information includes the set vehicle speed Vs and the set inter-vehicle distance Ds. The set vehicle speed Vs may be, for example, a value set or changed via the vehicle speed setting switch 23 or a value of an actual vehicle speed Va at the time when the instruction to execute the adaptive cruise control is received from the main switch 22, which may be selected depending on the situations. Further, the vehicle speed control unit 33 starts acquisition of the lane information (step ST2). The lane information includes the aforementioned shape of the travel lane ahead of the vehicle. The acquisition of the ACC information and the lane information in step ST1 and step ST2 is performed continuously from time to time.

Next, the vehicle speed control unit 33 determines whether the travel lane is straight (step ST3). The determination of whether the travel lane is straight is made based on both the radius of curvature Rp at the current position and the radius of curvature Rf at the future position. For example, it is determined that the lane is straight when the radii of curvature Rp, Rf at the current position and the future position are both larger than or equal to 2000 m, and it is determined that the lane is curved otherwise.

When it is determined that the travel lane is straight (ST3: Yes), the vehicle speed control unit 33 sets the set vehicle speed Vs as a target vehicle speed Vt (step ST4). The vehicle speed control unit 33 determines in step ST5 whether ACC is turned off, namely, whether an instruction to stop the adaptive cruise control is received from the ACC switch 12, and if ACC is not turned off (ST5: No), the vehicle speed control unit 33 repeats the process from step ST3. If ACC is turned off (ST5: Yes), the vehicle speed control unit 33 ends the vehicle speed control.

When it is determined in step ST3 that the travel lane is not straight (ST3: No), the vehicle speed control unit 33 determines whether LKAS is off, namely, whether the lane travel control is in a non-execution state (step ST6). When LKAS is off (ST6: Yes), the vehicle speed control unit 33 executes first curved-lane vehicle speed control (step ST7), and when LKAS is on (ST6: No), the vehicle speed control unit 33 executes second curved-lane vehicle speed control (step ST8). The first curved-lane vehicle speed control and the second curved-lane vehicle speed control will be described in detail with reference to FIGS. 3 and 4.

Figure 3:
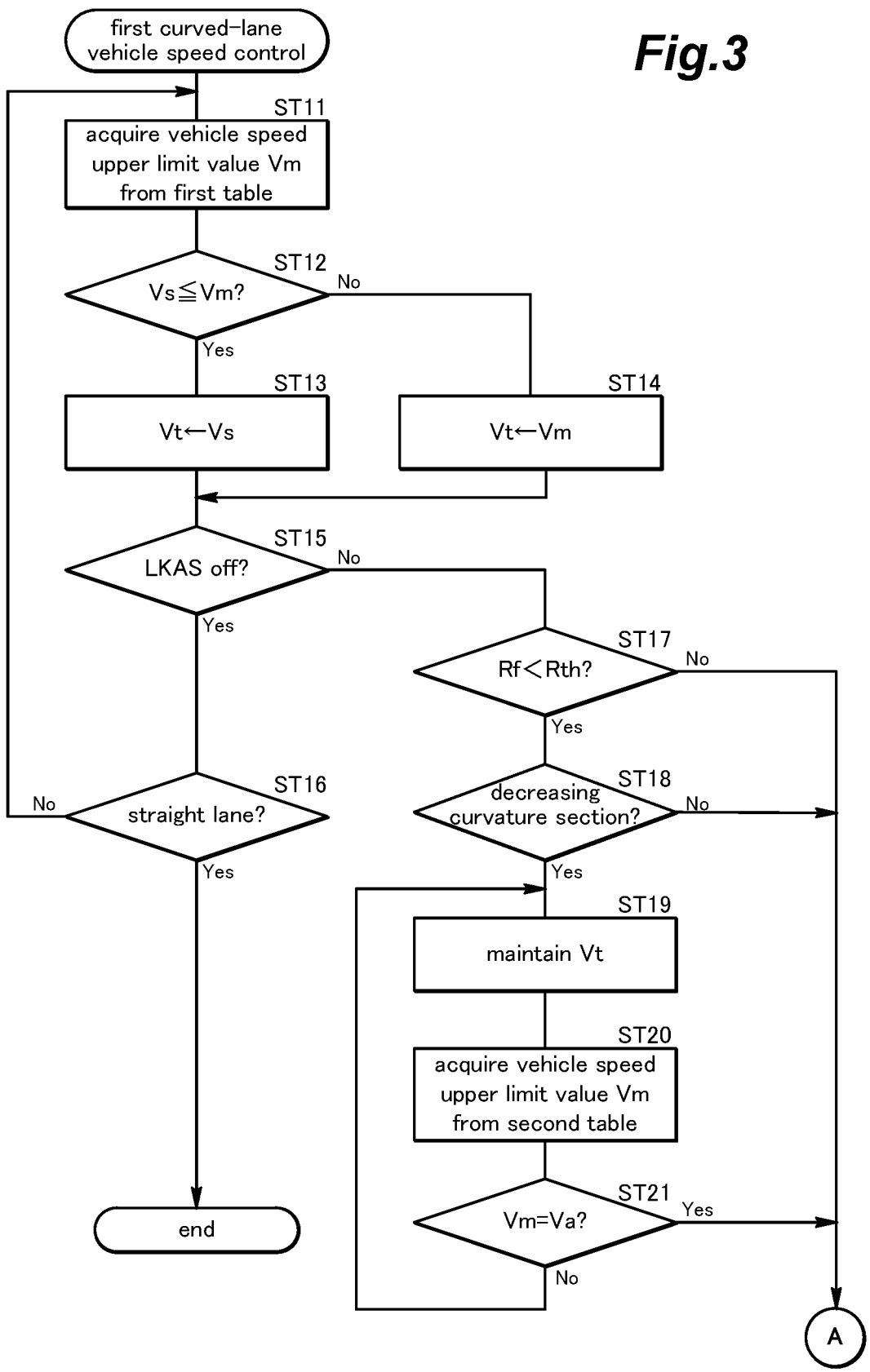
FIG. 3 is a flowchart of first curved-lane vehicle speed control of the vehicle speed control shown in FIG. 2.

In the first curved-lane vehicle speed control, the vehicle speed control unit 33 executes the process shown in FIG. 3. First, the vehicle speed control unit 33 acquires a vehicle speed upper limit value Vm from a first table (step ST11). Note that, in the second curved-lane vehicle speed control shown in FIG. 4, the vehicle speed control unit 33 first acquires the vehicle speed upper limit value Vm from a second table (step ST31). The vehicle speed upper limit value Vm set in the first table and the vehicle speed upper limit value Vm set in the second table are respectively determined based on an LKAS-off lateral acceleration limit value Gm1 set in the first table and an LKAS-on lateral acceleration limit value Gm2, as described below.

Figure 5:
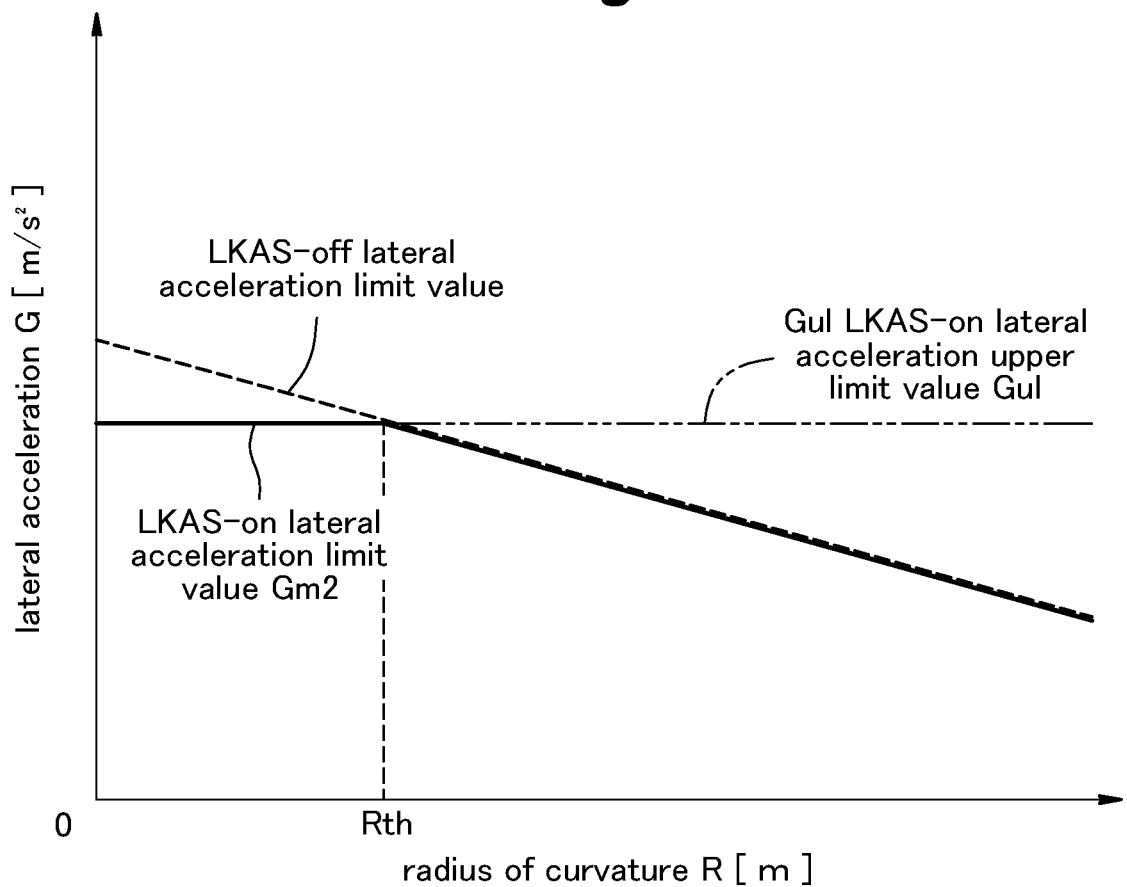
FIG. 5 is a graph showing the relationship between a radius of curvature of a lane and a lateral acceleration limit value.

FIG. 5 shows the LKAS-off lateral acceleration limit value Gm1 set in the first table and the LKAS-on lateral acceleration limit value Gm2 set in the second table. Both of these lateral acceleration limit values Gm (Gm1, Gm2) are set to increase as the radius of curvature R of the travel lane becomes smaller (namely, as the curvature of the lane becomes larger).

This is because when the vehicle travels along a sharp curve having a small radius of curvature R, even if the lateral acceleration G increases to a relatively large value, the occupant can tolerate the lateral acceleration G. In other words, if the vehicle speed V is lowered to reduce the lateral acceleration G, the occupant is likely to feel it disturbing and the convenience of the vehicle speed control is reduced. Thus, setting is made such that a larger lateral acceleration G is tolerated when the vehicle travels along a sharp curve having a small radius of curvature R compared to when the vehicle travels along a gentle curve having a large radius of curvature R, whereby the convenience of the vehicle speed control is enhanced.

Also, an upper limit value (Gul) of the lateral acceleration G is set for when LKAS is on. The LKAS-on lateral acceleration upper limit value Gul is set to have a constant magnitude regardless of the magnitude of the radius of curvature R. For the radius of curvature R smaller than a prescribed value Rth, the LKAS-on lateral acceleration limit value Gm2 is set to the LKAS-on lateral acceleration upper limit value Gul, whereby the LKAS-on lateral acceleration limit value Gm2 is smaller than the LKAS-off lateral acceleration limit value Gm1.

The LKAS-on lateral acceleration upper limit value Gul may be set to 3 m/s$^2$, for example. Thereby, the LKAS-on lateral acceleration limit value Gm2 is set to a value smaller than or equal to 3 m/s$^2$ for any curved lane having an arbitrary radius of curvature R. For the radius of curvature R larger than or equal to the prescribed value Rth, the LKAS-on lateral acceleration limit value Gm2 is set to the same value as the LKAS-off lateral acceleration limit value Gm1.

Based on the lateral acceleration limit values Gm1, Gm2 set as described above, the vehicle speed upper limit value Vm is set in the first and second tables, respectively. Each of the first and second tables is in the form of a map setting the vehicle speed upper limit value Vm according to the magnitude of the radius of curvature R.

Thus, mutually different lateral acceleration limit values Gm (Gm1, Gm2) are set in the first and second tables according to the radius of curvature R of the travel lane, and the vehicle speed upper limit value Vm is set in each of the first and second tables according to the corresponding lateral acceleration limit value Gm (Gm1, Gm2). Namely, the vehicle speed upper limit value Vm is set in the first and second tables as mutually different values, and in accordance with the determination in step ST6 of FIG. 2, one of the first and second tables is referred to, whereby the vehicle speed upper limit value Vm is set to different values depending on whether the lane travel control (LKAS) is being executed. Specifically, the vehicle speed upper limit value Vm is set to be lower in the second table which is referred to when the lane travel control is being executed than in the first table which is referred to when the lane travel control is not being executed.

The vehicle speed upper limit value Vm is a value used as the target vehicle speed Vt to decelerate the vehicle when the vehicle enters a curved lane, for example. Therefore, when the vehicle enters a curved lane, the vehicle speed upper limit value Vm is set by using the minimum of the radius of curvature R from the current position to the future position, namely, the radius of curvature Rf at the future position, so that sufficient deceleration is achieved by the time the vehicle enters the curved lane. Also, in the case where the vehicle proceeds from a curved lane to a straight lane, if the radius of curvature Rf at the future position were used to set the vehicle speed upper limit value Vm, it may result in overspeed of the vehicle at the current position. Therefore, when the vehicle travels along a decreasing curvature section also, the minimum of the radius of curvature R from the current position to the future position (in this case, the radius of curvature Rp at the current position) is used.

With reference to FIG. 3 again, after acquiring the vehicle speed upper limit value from the first table Vm in step ST11, the vehicle speed control unit 33 determines whether the set vehicle speed Vs is lower than or equal to the vehicle speed upper limit value Vm (step ST12). When the set vehicle speed Vs is lower than or equal to the vehicle speed upper limit value Vm (ST12: Yes), the vehicle speed control unit 33 sets the set vehicle speed Vs as the target vehicle speed Vt and executes the vehicle speed control (step ST13). If the set vehicle speed Vs is higher than the vehicle speed upper limit value Vm (ST12: No), the vehicle speed control unit 33 sets the vehicle speed upper limit value Vm as the target vehicle speed Vt and executes the vehicle speed control (step ST14).

Subsequently, the vehicle speed control unit 33 determines in step ST15 whether LKAS is off, namely, whether the state in which the instruction to execute the lane keeping assist control is not input from the LKAS switch 13 is continuing. If LKAS remains off (ST15: Yes), the vehicle speed control unit 33 determines whether the travel lane is straight (step ST16). If the travel lane is straight (ST16: Yes), the vehicle speed control unit 33 ends the first curved-lane vehicle speed control and proceeds to step ST4 of FIG. 2.

If the instruction to execute the lane keeping assist control is received from the LKAS switch 13 and accordingly it is determined in step ST15 that LKAS is turned on (ST15: No), the vehicle speed control unit 33 determines whether the radius of curvature Rf at the future position is smaller than the prescribed value Rth (step ST17). This determination is made to determine whether the travel lane is curved with such a large curvature that necessitates the limitation of the LKAS-on lateral acceleration limit value Gm2 to a value smaller than the LKAS-off lateral acceleration limit value Gm1 as shown in FIG. 5.

When the radius of curvature Rf at the future position is larger than or equal to the prescribed value Rth (ST17: No), the vehicle speed control unit 33 proceeds to the second curved-lane vehicle speed control (step ST8) in FIG. 2. In the case where the radius of curvature Rf at the future position is smaller than the prescribed value Rth (ST17: Yes), the vehicle speed control unit 33 determines whether the vehicle is traveling in a decreasing curvature section of the curved lane (step ST18). The determination of whether the vehicle is traveling in the decreasing curvature section is made based on the radius of curvature Rp at the current position and the radius of curvature Rf at the future position. Specifically, when the radius of curvature Rf at the future position is larger than the radius of curvature Rp at the current position, it is determined that the vehicle is traveling in the decreasing curvature section. Conversely, when the radius of curvature Rf at the future position is smaller than the radius of curvature Rp at the current position, it is determined that the vehicle is traveling in an increasing curvature section of the curved lane. Also, when the radii of curvature Rf, Rp are the same, it is determined that the vehicle is traveling in a constant curvature section of the curved lane.

If it is determined in step ST18 that the vehicle is not traveling in the decreasing curvature section of the lane (ST18: No), the vehicle speed control unit 33 proceeds to the second curved-lane vehicle speed control (step ST8) in FIG. 2. If it is determined in step ST18 that the vehicle is traveling in the decreasing curvature section of the lane (ST18: Yes), the vehicle speed control unit 33 maintains the value of the target vehicle speed Vt (step ST19). Then, the vehicle speed control unit 33 acquires the vehicle speed upper limit value Vm from the second table (step ST20) and determines whether this vehicle speed upper limit value Vm matches the actual vehicle speed Va (step ST21). The vehicle speed control unit 33 repeats the process from step ST19 until the determination result in step ST21 becomes Yes. When the vehicle speed upper limit value Vm acquired from the second table increases along with a decrease in the curvature of the travel lane to such a degree that the vehicle speed upper limit value Vm matches the actual vehicle speed Va (ST21: Yes), the vehicle speed control unit 33 proceeds to the second curved-lane vehicle speed control (step ST8) in FIG. 2.

In this way, when LKAS is turned on (ST15: No), if the radius of curvature Rf at the future position is larger than the radius of curvature Rp at the current position (ST18: Yes), the vehicle speed control unit 33 does not immediately use the vehicle speed upper limit value Vm acquired from the second table (which has a value smaller than the vehicle speed upper limit value Vm acquired from the first table), but limits the decrease in the target vehicle speed Vt (or maintain the target vehicle speed Vt) until the vehicle speed upper limit value Vm acquired from the second table increases so that the determination result in step ST21 becomes Yes.

Next, the second curved-lane vehicle speed control will be described with reference to FIG. 4. As mentioned above, the vehicle speed control unit 33 first acquires the vehicle speed upper limit value Vm from the second table (step ST31). Thereafter, the vehicle speed control unit 33 determines whether the set vehicle speed Vs is lower than or equal to the vehicle speed upper limit value Vm (step ST32). When the set vehicle speed Vs is lower than or equal to the vehicle speed upper limit value Vm (ST32: Yes), the vehicle speed control unit 33 sets the set vehicle speed Vs as the target vehicle speed Vt and executes the vehicle speed control (step ST33). If the set vehicle speed Vs is higher than the vehicle speed upper limit value Vm (ST32: No), the vehicle speed control unit 33 sets the vehicle speed upper limit value Vm as the target vehicle speed Vt and executes the vehicle speed control (step ST34).

Subsequently, the vehicle speed control unit 33 determines in step ST35 whether LKAS is on, namely, the state in which the instruction to stop the lane keeping assist control is not input from the LKAS switch 13 is continuing. If LKAS remains on (ST35: Yes), the vehicle speed control unit 33 determines whether the travel lane is straight (step ST36). If the travel lane is straight (ST36: Yes), the vehicle speed control unit 33 ends the second curved-lane vehicle speed control and proceeds to step ST4 of FIG. 2.

If the instruction to stop the lane keeping assist control is received from the LKAS switch 13 and accordingly it is determined in step ST35 that LKAS is turned off (ST35: No), the vehicle speed control unit 33 determines whether the radius of curvature Rf at the future position is smaller than the prescribed value Rth (step ST37). This determination is made to determine whether the travel lane is curved with such a large curvature that necessitates the limitation of the LKAS-on lateral acceleration limit value Gm2 to a value smaller than the LKAS-off lateral acceleration limit value Gm1 as shown in FIG. 5.

When the radius of curvature Rf at the future position is larger than or equal to the prescribed value Rth (ST37: No), the vehicle speed control unit 33 proceeds to the first curved-lane vehicle speed control (step ST7) in FIG. 2. In the case where the radius of curvature Rf at the future position is smaller than the prescribed value Rth (ST37: Yes), the vehicle speed control unit 33 determines whether the vehicle is traveling in an increasing curvature section of the curved lane (step ST38). The determination of whether the vehicle is traveling in the increasing curvature section is made based on the radius of curvature Rp at the current position and the radius of curvature Rf at the future position, as described above.

If it is determined in step ST38 that the vehicle is not traveling in the increasing curvature section of the lane (ST38: No), the vehicle speed control unit 33 proceeds to the first curved-lane vehicle speed control (step ST7) in FIG. 2. If it is determined in step ST38 that the vehicle is traveling in the increasing curvature section of the lane (ST38: Yes), the vehicle speed control unit 33 maintains the value of the target vehicle speed Vt (step ST39). Then, the vehicle speed control unit 33 acquires the vehicle speed upper limit value Vm from the first table (step ST40) and determines whether this vehicle speed upper limit value Vm matches the actual vehicle speed Va (step ST41). The vehicle speed control unit 33 repeats the process from step ST39 until the determination result in step ST41 becomes Yes. When the vehicle speed upper limit value Vm acquired from the second table decreases along with an increase in the curvature of the travel lane to such a degree that the vehicle speed upper limit value Vm matches the actual vehicle speed Va (ST41: Yes), the vehicle speed control unit 33 proceeds to the first curved-lane vehicle speed control (step ST7) in FIG. 2.

In this way, LKAS is turned off (ST35: No), if the radius of curvature Rf at the future position is smaller than the radius of curvature Rp at the current position (ST38: Yes), the vehicle speed control unit 33 does not immediately use the vehicle speed upper limit value Vm acquired from the first table (which is higher than the vehicle speed upper limit value Vm acquired from the second table), but limits the increase in the target vehicle speed Vt until the vehicle speed upper limit value Vm acquired from the first table decreases so that the determination result in step ST41 becomes Yes.

Figure 4:
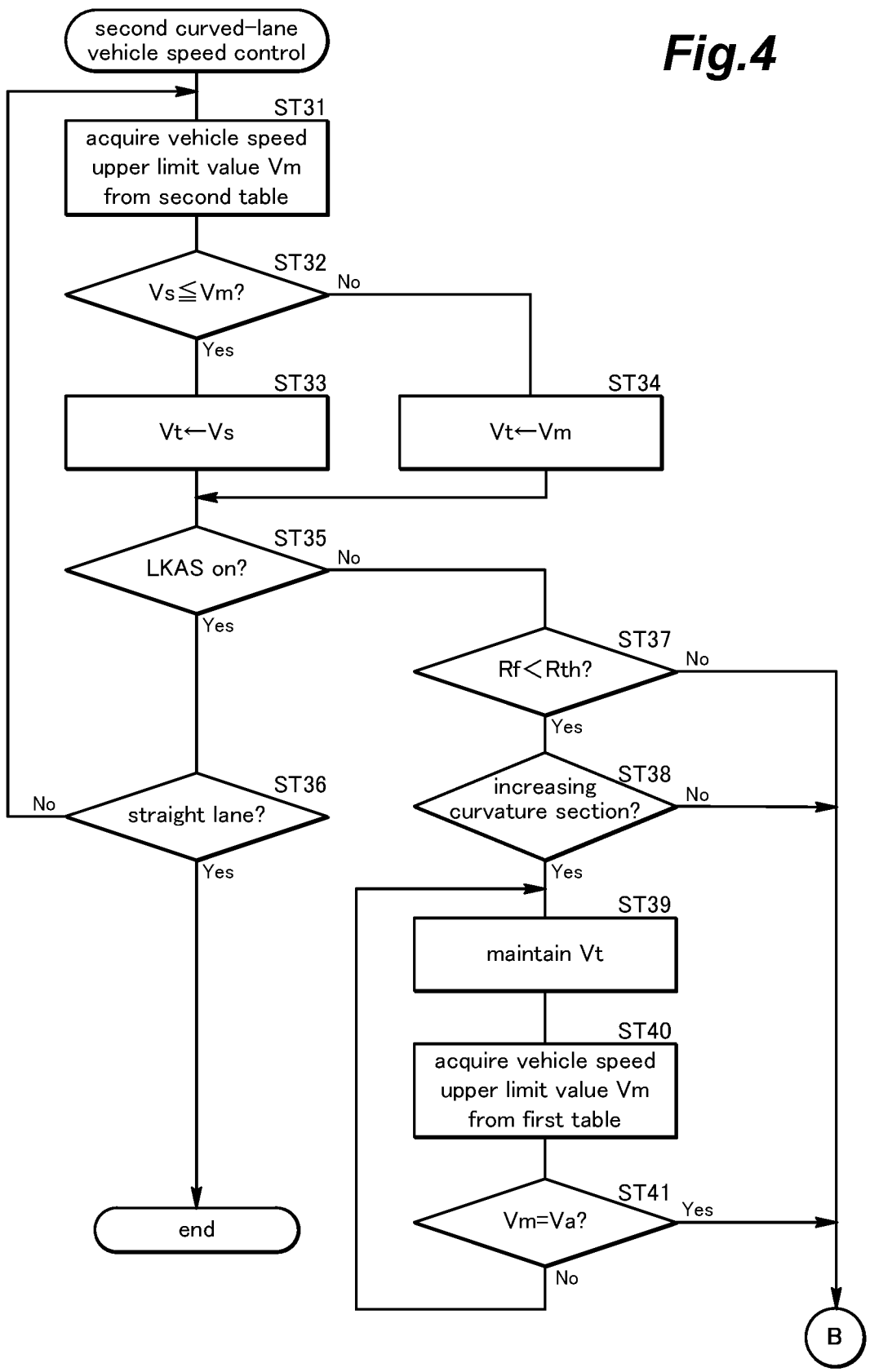
FIG. 4 is a flowchart of the second curved-lane vehicle speed control of the vehicle speed control shown in FIG. 2.

Thus, by executing the process from step ST18 to step ST21 of FIG. 3 and the process from step ST38 to step ST41 of FIG. 4, the vehicle speed control unit 33 limits the fluctuation of the vehicle speed upper limit value Vm based on the radius of curvature Rf at the future position. Thereby, the discomfort that may be felt by the occupant due to frequent fluctuation of the vehicle speed upper limit value Vm can be suppressed, and the marketability of the vehicle equipped with the travel control device 1 can be improved. This will be described more in detail later with reference to concrete examples.

The vehicle speed control unit 33 executes the vehicle speed control in accordance with the above-described process.

Next, the behavior of the vehicle under the vehicle speed control executed by the vehicle speed control unit 33 as above will be described with reference to FIGS. 6 to 12. FIGS. 6 to 12 show various different traveling situations of the vehicle.

Figure 6:
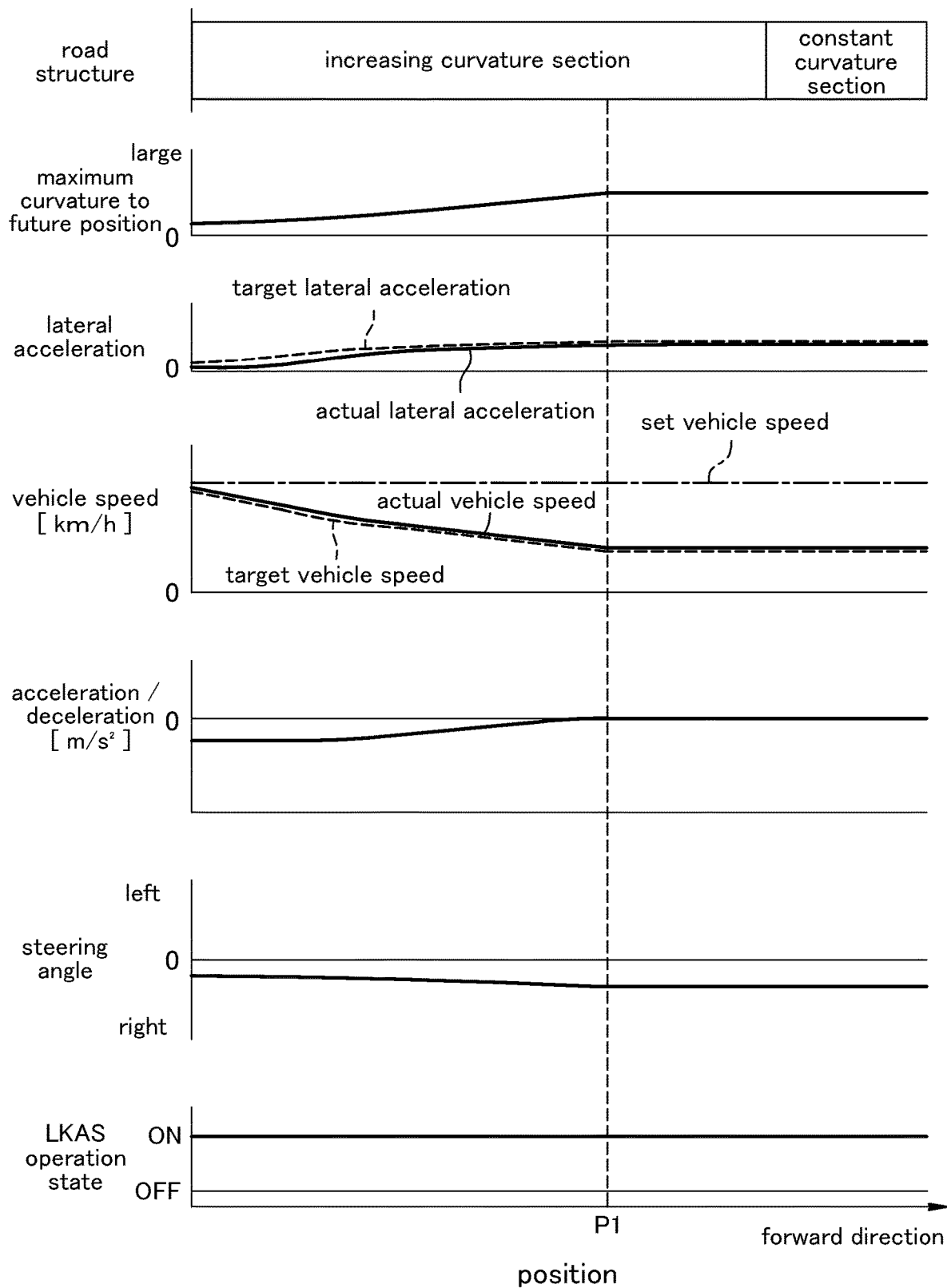
FIG. 6 is an explanatory diagram of operation of the vehicle speed control according to the embodiment.

FIG. 6 shows a situation in which the vehicle has entered a curved lane with LKAS on. In this situation, as the vehicle proceeds, the maximum curvature from the current position to the future position (the point where the vehicle will travel 10 seconds later, in this example) increases (the radius of curvature R decreases). Consequently, as the vehicle proceeds, the target lateral acceleration Gt limited by the LKAS-on lateral acceleration limit value Gm2 acquired from the second table increases while the target vehicle speed Vt limited by the vehicle speed upper limit value Vm decreases. The actual lateral acceleration Ga increases following the target lateral acceleration Gt, and the actual vehicle speed Va decreases following the target vehicle speed Vt. The changes of the target lateral acceleration Gt and the target vehicle speed Vt end at a point P1 located before the start point of a constant curvature section in which the maximum curvature from the current position to the future position is constant, and thereafter, the target lateral acceleration Gt and the target vehicle speed Vt have constant values.

Figure 7:
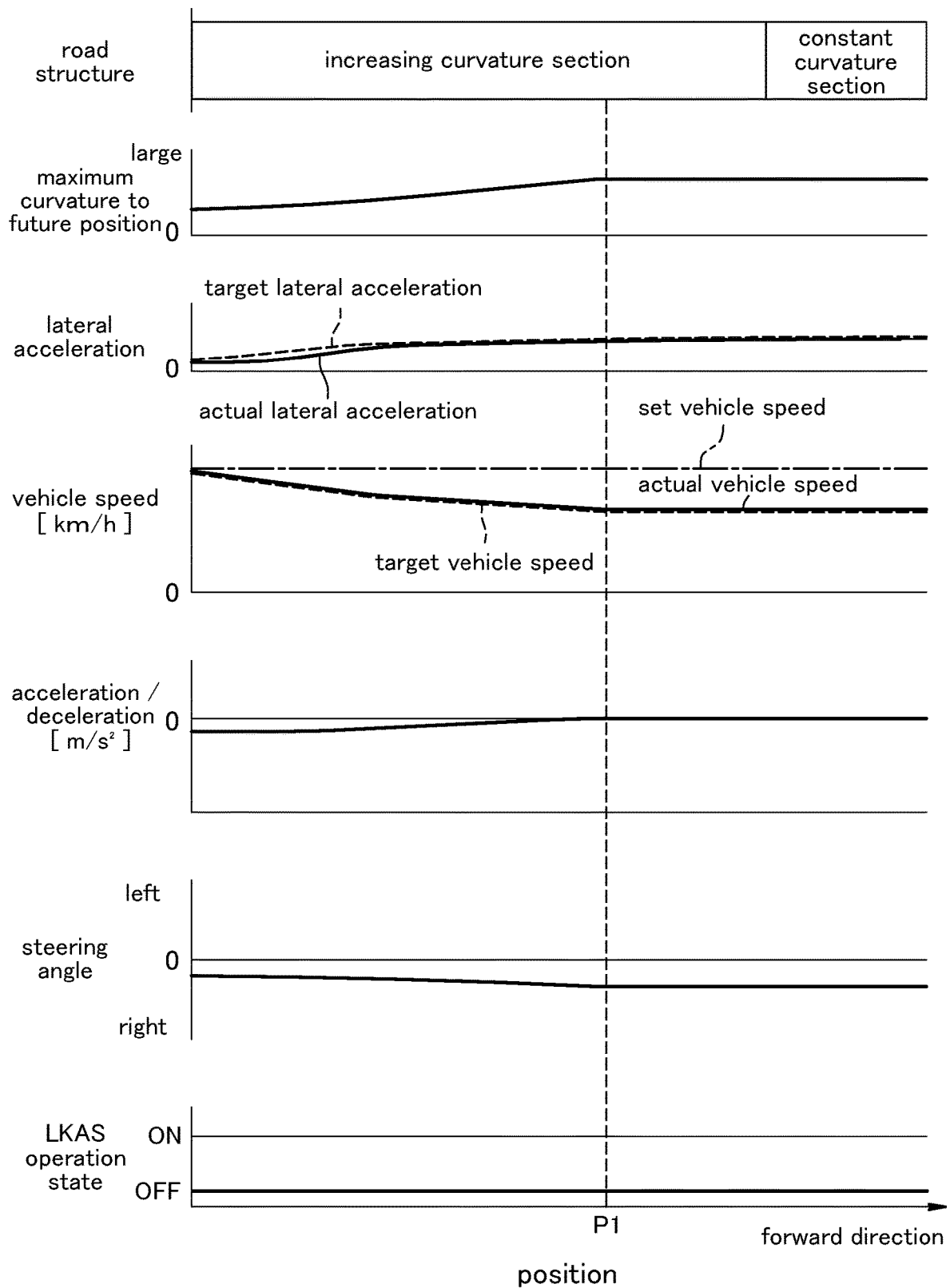
FIG. 7 is an explanatory diagram of operation of the vehicle speed control according to the embodiment.

FIG. 7 shows a situation in which the vehicle has entered a curved lane with LKAS off. In this situation, as the vehicle proceeds, the maximum curvature from the current position to the future position increases (the minimum radius of curvature R decreases). Consequently, the target lateral acceleration Gt limited by the LKAS-off lateral acceleration limit value Gm1 acquired from the first table increases more than the situation of FIG. 6 while the target vehicle speed Vt limited by the vehicle speed upper limit value Vm decreases with a smaller deceleration than in the situation of FIG. 6. As in the case of FIG. 6, the actual lateral acceleration Ga increases following the target lateral acceleration Gt, the actual vehicle speed Va decreases following the target vehicle speed Vt, and the changes of the target lateral acceleration Gt and the target vehicle speed Vt end at the point P1.

Figure 8:
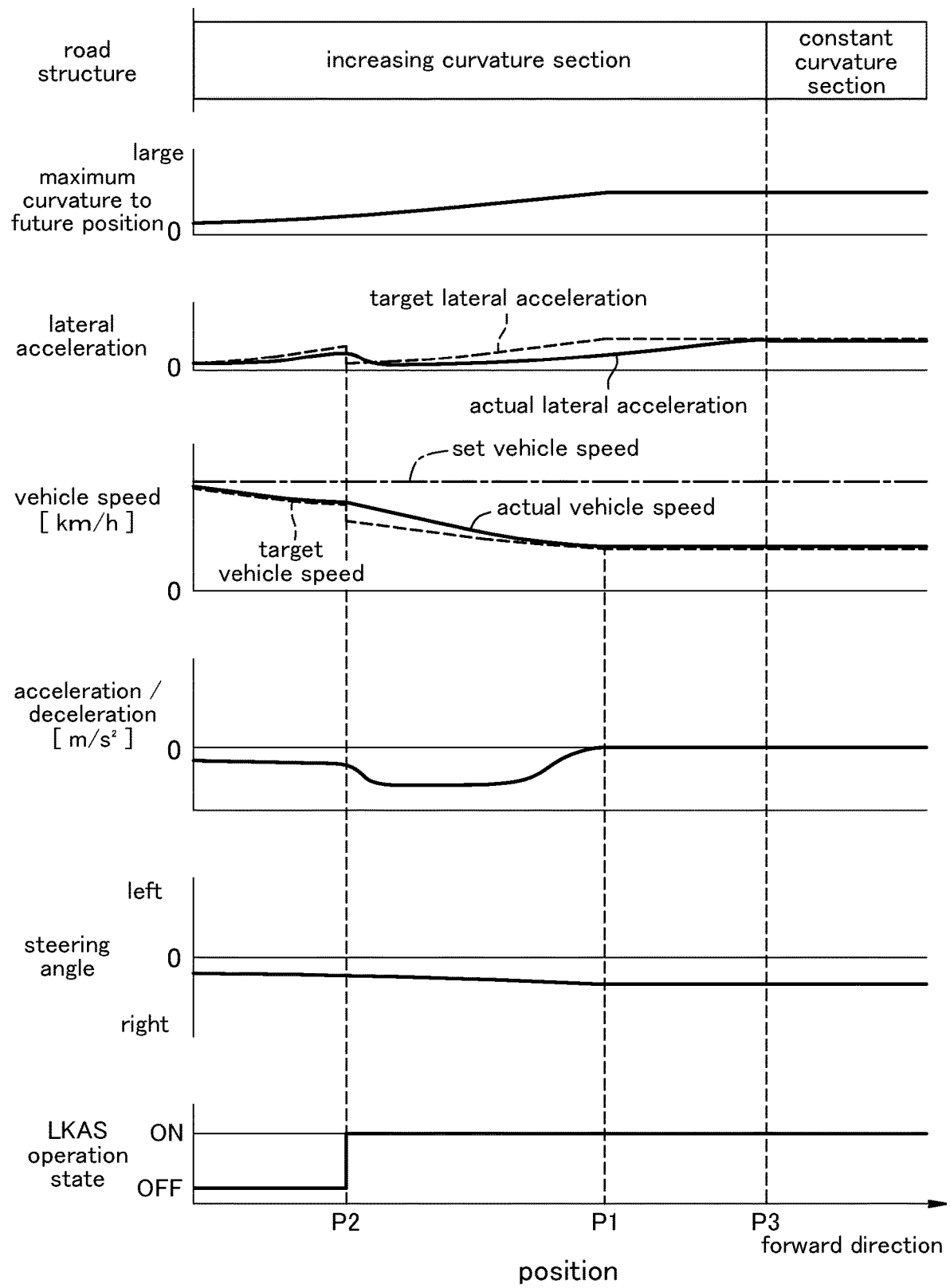
FIG. 8 is an explanatory diagram of operation of the vehicle speed control according to the embodiment.

FIG. 8 shows a situation in which the vehicle has entered a curved lane with LKAS off, and LKAS is turned on in the increasing curvature section. In this situation, as the vehicle proceeds, the maximum curvature from the current position to the future position increases (the radius of curvature R decreases). At a point P2 where LKAS is turned on, the target lateral acceleration Gt decreases in a stepped manner by being switched from the value limited by the LKAS-off lateral acceleration limit value Gm1 to the value limited by the LKAS-on lateral acceleration limit value Gm2, and accordingly the target vehicle speed Vt also is lowered in a stepped manner. Thereby, the deceleration thereafter becomes large, and the actual lateral acceleration Ga and the actual vehicle speed Va change to approach the respective target values. At the point P1 from which the maximum curvature from the current position to the future position becomes constant, the changes of the target lateral acceleration Gt and the target vehicle speed Vt end, and thereafter, the target lateral acceleration Gt and the target vehicle speed Vt have constant values. The actual vehicle speed Va matches the target vehicle speed Vt at the point P1 and does not change thereafter, but since the curvature of the lane increases thereafter, the actual lateral acceleration Ga increases to match the target lateral acceleration Gt at a point P3 which is a start point of the constant curvature section.

Figure 9:
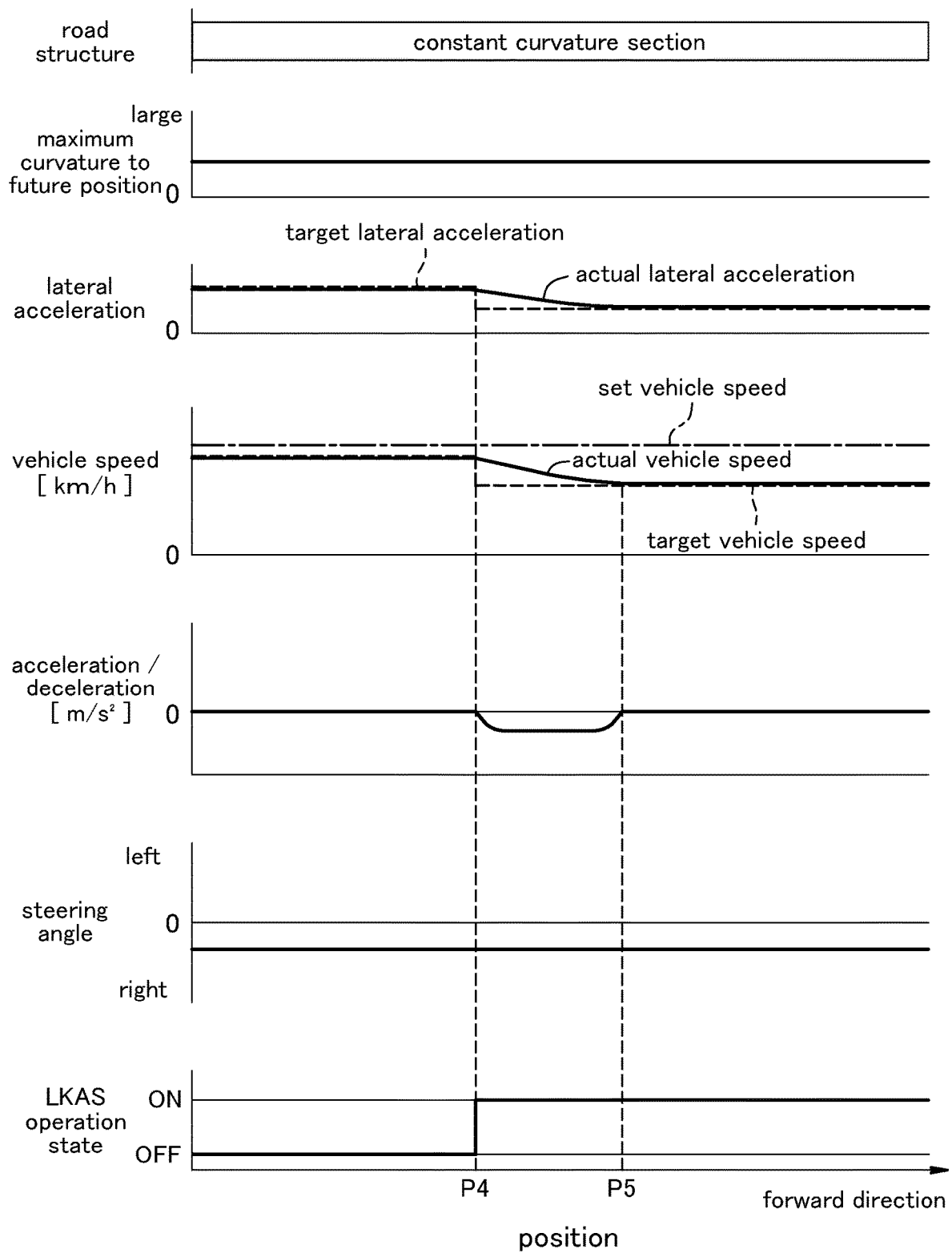
FIG. 9 is an explanatory diagram of operation of the vehicle speed control according to the embodiment.

FIG. 9 shows a situation in which LKAS is turned on from off while the vehicle is traveling in a constant curvature section of a curved lane. In this situation, at a point P4 where LKAS is turned on, the target lateral acceleration Gt decreases in a stepped manner by being switched from the value limited by the LKAS-off lateral acceleration limit value Gm1 to the value limited by the LKAS-on lateral acceleration limit value Gm2, and accordingly the target vehicle speed Vt also is lowered in a stepped manner. Thereby, the deceleration becomes large, and the actual lateral acceleration Ga and the actual vehicle speed Va change to approach the respective target values. The deceleration by the adaptive cruise control continues to a point P5 where the actual vehicle speed Va matches the target vehicle speed Vt, and thereafter the vehicle speed V becomes constant without acceleration or deceleration.

Figure 10:
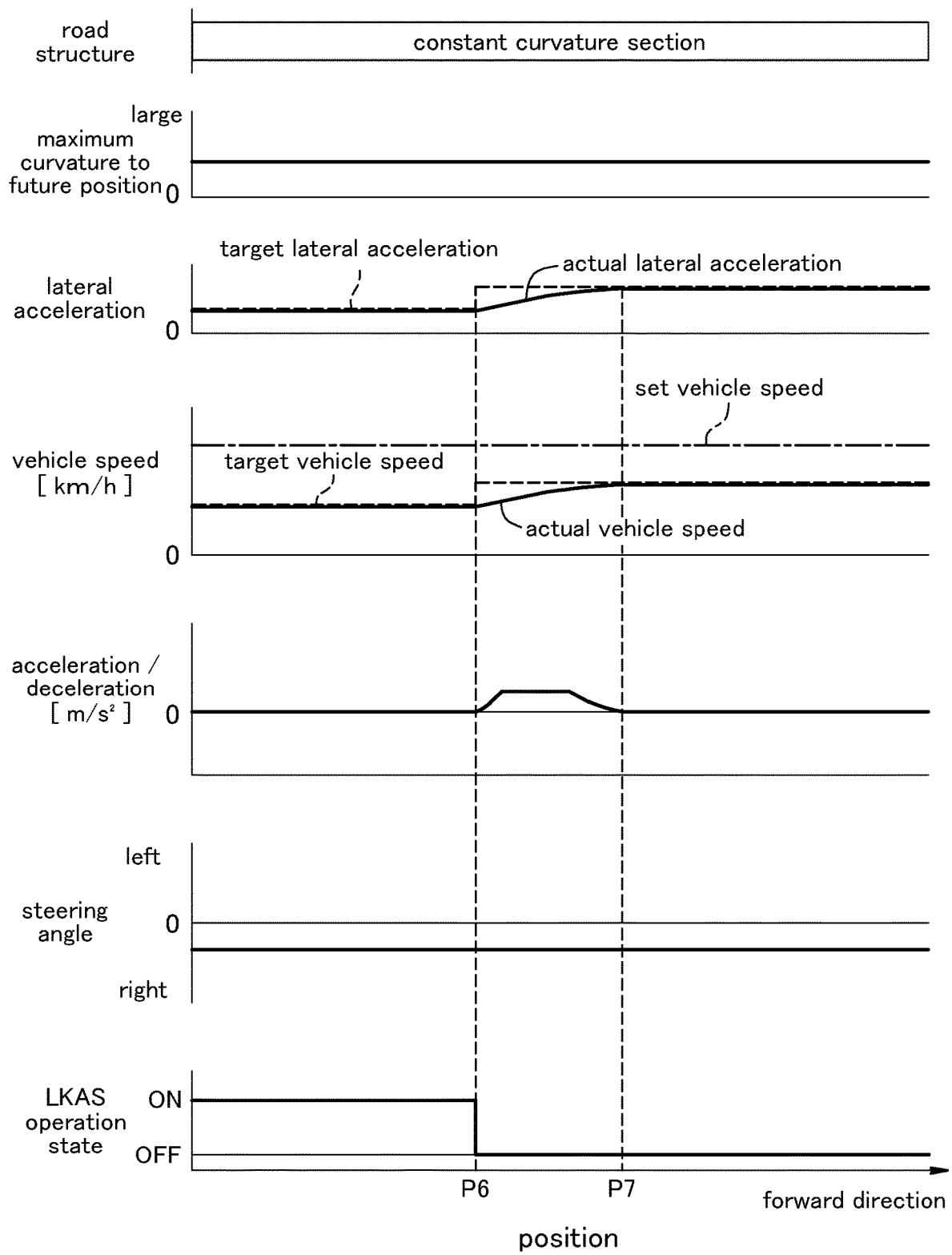
FIG. 10 is an explanatory diagram of operation of the vehicle speed control according to the embodiment.

FIG. 10 shows a situation in which LKAS is turned off from on while the vehicle is traveling in a constant curvature section of a curved lane. In this situation, at a point P6 where LKAS is turned off, the target lateral acceleration Gt increases in a stepped manner by being switched from the value limited by the LKAS-on lateral acceleration limit value Gm2 to the value limited by the LKAS-off lateral acceleration limit value Gm1, and accordingly the target vehicle speed Vt also increases in a stepped manner. Thereby, the acceleration becomes large, and the actual lateral acceleration Ga and the actual vehicle speed Va change to approach the respective target values. The acceleration by the adaptive cruise control continues to a point P7 where the actual vehicle speed Va matches the target vehicle speed Vt, and thereafter the vehicle speed V becomes constant without acceleration or deceleration.

Figure 11:
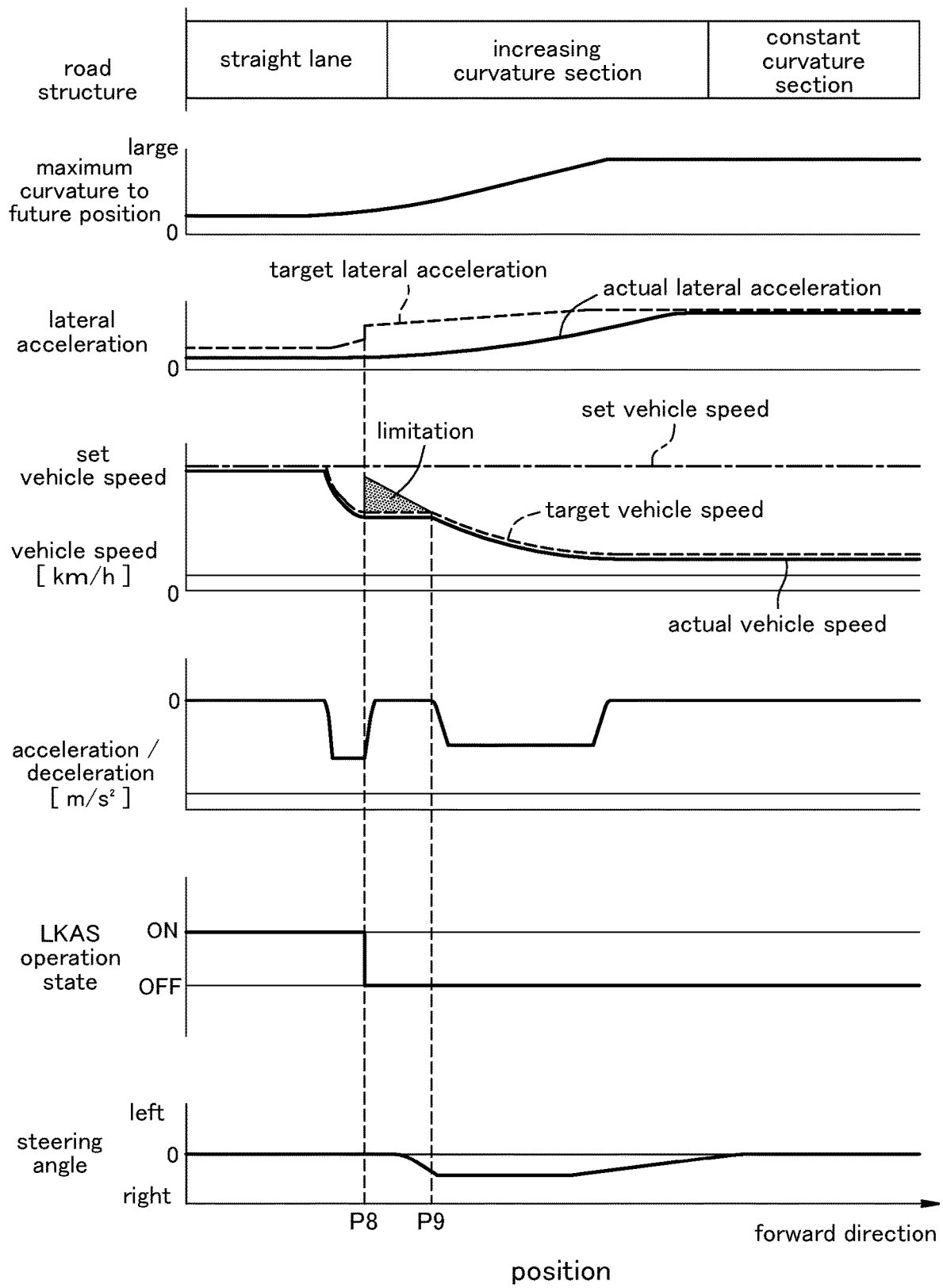
FIG. 11 is an explanatory diagram of operation of the vehicle speed control according to the embodiment.

FIG. 11 shows a situation in which the vehicle travels from a straight lane to a curved lane and LKAS is turned from on to off a little before the vehicle enters the curved lane, namely, LKAS is turned off during deceleration of the vehicle. In this situation, from before the vehicle enters the curved lane, the target lateral acceleration Gt, which is limited by the LKAS-on lateral acceleration limit value Gm2 acquired from the second table, starts increasing, and the target vehicle speed Vt, which is limited by the vehicle speed upper limit value Vm acquired from the second table, starts decreasing as the future position of the vehicle has entered an increasing curvature section of the curved lane, in which the radius of curvature R of the lane gradually decreases (namely, it is determined that the vehicle is traveling in the increasing curvature section of the curved lane). Thereafter, at a point P8 where LKAS is turned off, the target lateral acceleration Gt increases in a stepped manner by being switched from the value limited by the LKAS-on lateral acceleration limit value Gm2 to the value limited by the LKAS-off lateral acceleration limit value Gm1. Also, if the process from step ST39 to step ST41 in FIG. 4 were not provided, the vehicle speed upper limit value Vm acquired from the second table would be switched to the vehicle speed upper limit value Vm acquired from the first table, which is higher than the vehicle speed upper limit value Vm acquired from the second table, and therefore, the target vehicle speed Vt would be increased to a high value in a stepped manner.

However, from the point P8 onward, the vehicle speed upper limit value Vm acquired from the first table (and hence the target vehicle speed Vt limited thereby) gradually decreases as the vehicle travels because the future position of the vehicle is in the increasing curvature section of the curved lane. Therefore, in the case where LKAS is turned from on to off while the vehicle is being decelerated by the vehicle speed control unit 33, if no measures were taken, the vehicle speed control unit 33 would accelerate the vehicle in accordance with the increase in the target vehicle speed Vt in the stepped manner and then decelerate the vehicle in accordance with the gradual decrease in the target vehicle speed Vt. Such vehicle speed control that would result in frequent change of the vehicle behavior would reduce the marketability of the vehicle.

In the present embodiment, owing to the provision of the process from step ST39 to step ST41, when LKAS is turned off at the point P8 slightly before the vehicle enters the curved lane (and hence, while the vehicle is being decelerated by the vehicle speed control unit 33), the target vehicle speed Vt is maintained at the value of the vehicle speed upper limit value Vm acquired from the second table until the vehicle reaches a point P9 where the vehicle speed upper limit value Vm acquired from the first table matches the actual vehicle speed Va. Namely, an increase in the vehicle speed upper limit value Vm caused by the stop of LKAS (the portion shown by hatching in FIG. 11) is limited. Thus, in the above situation, the vehicle speed control unit 33 limits the increase in the vehicle speed upper limit value Vm so that undesired acceleration of the vehicle before deceleration is prevented, whereby the marketability of the vehicle can be improved.

Figure 12:
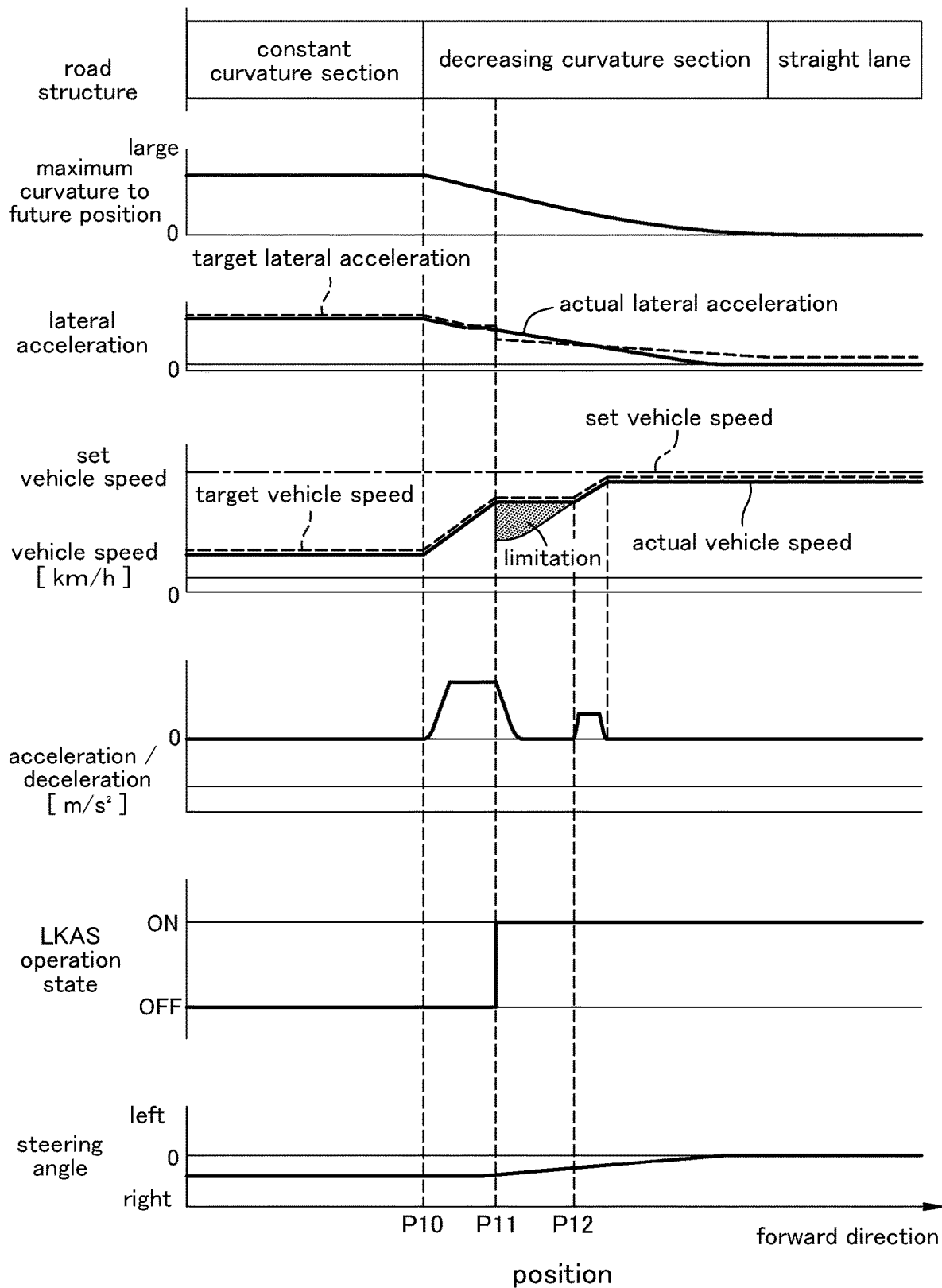
FIG. 12 is an explanatory diagram of operation of the vehicle speed control according to the embodiment.

FIG. 12 shows a situation in which the vehicle is traveling on a curved lane toward a straight lane with LKAS off, and LKAS is turned on during acceleration of the vehicle in a decreasing curvature section of the curved lane. In this situation, the target lateral acceleration Gt limited by the LKAS-off lateral acceleration limit value Gm1 acquired from the first table starts decreasing from a point P10 where the decreasing curvature section starts, while the target vehicle speed Vt limited by the vehicle speed upper limit value Vm acquired from the first table starts increasing from the point P10. Thereafter, at a point P11 where LKAS is turned on, the target lateral acceleration Gt decreases in a stepped manner by being switched from the value limited by the LKAS-off lateral acceleration limit value Gm1 to the value limited by the LKAS-on lateral acceleration limit value Gm2. Also, if the process from step ST19 to step ST21 in FIG. 3 were not provided, the vehicle speed upper limit value Vm acquired from the first table were switched to the vehicle speed upper limit value Vm acquired from the second table, which is lower than the vehicle speed upper limit value Vm acquired from the first table, and therefore, the target vehicle speed Vt would be decreased to a low value in a stepped manner.

However, from the point P11 onward, the vehicle speed upper limit value Vm acquired from the second table (and hence the target vehicle speed Vt limited thereby) gradually increases as the vehicle travels because the vehicle is in the decreasing curvature section of the curved lane in which the radius of curvature R gradually increases. Therefore, in the case where LKAS is not executed when the vehicle enters the decreasing curvature section and then is started while the vehicle is traveling in the decreasing curvature section (namely, during acceleration of the vehicle), if no measures were taken, the vehicle speed control unit 33 would decelerate the vehicle in accordance with the decrease in the target vehicle speed Vt in the stepped manner and then accelerate the vehicle in accordance with the gradual increase in the target vehicle speed Vt. Such vehicle speed control that would result in frequent change of the vehicle the behavior would reduce the marketability of the vehicle.

In the present embodiment, owing to the provision of the process from step ST19 to step ST21, when LKAS is turned on at the point P11 while the vehicle is traveling in the decreasing curvature section of the curved lane (and hence, while the vehicle is being accelerated by the vehicle speed control unit 33), the target vehicle speed Vt is maintained at the value of the vehicle speed upper limit value Vm acquired from the first table until the vehicle reaches a point P12 where the vehicle speed upper limit value Vm acquired from the second table matches the actual vehicle speed Va.

Namely, a decrease in the vehicle speed upper limit value Vm caused by the start of LKAS (the portion shown by hatching in FIG. 12) is limited. Thus, in the above situation, the vehicle speed control unit 33 limits the decrease in the vehicle speed upper limit value Vm so that undesired deceleration of the vehicle before acceleration is prevented, whereby the marketability of the vehicle can be improved.

Note that in the section from the point P11 to the point P12, the actual lateral acceleration Ga is larger than the target lateral acceleration Gt. This means that in this section, the steering of the vehicle control performed by the control device 15 may not provide sufficient steering power and the steering operation by the user may be required to intervene.

Next, effects provided by the vehicle speed control performed as above will be described below. As described above, the vehicle speed upper limit value Vm is set to different values depending on whether LKAS is executed. Therefore, the vehicle speed upper limit value Vm during a turn of the vehicle is set to different values depending on whether LKAS is executed, whereby the vehicle speed control unit 33 can perform appropriate vehicle speed control in accordance with whether only the vehicle speed is controlled or both the vehicle speed and the trajectory (steering) of the vehicle are controlled.

In the case where only the vehicle speed V is controlled, the driver performs the steering operation while being aware of the shape of the travel lane (road), and therefore, even if the vehicle speed V is maintained at a relatively high speed, the level of uneasiness felt by the driver is low. On the other hand, in the case where both the vehicle speed V and the steering are controlled, attention of the driver on the steering is relatively low, and therefore, the driver tends to feel uneasiness from a turn of the vehicle with a large lateral acceleration G. In the present embodiment, when LKAS is being executed the vehicle speed control unit 33 sets the vehicle speed upper limit value Vm to be lower than when LKAS is not being executed, as described above. Thereby, when LKAS is being executed by the steering control unit 32, the target vehicle speed Vt is limited by a lower vehicle speed upper limit value Vm compared to when the driver performs the steering operation, so that the ability to follow the lane is improved. This also suppresses the uneasiness that may be felt by the driver on the turning performed by LKAS. When the driver performs the steering operation, the vehicle speed V is allowed to be higher compared to when LKAS is being executed by the steering control unit 32, whereby an increase in the distance to the preceding vehicle due to the limitation of the vehicle speed can be suppressed, namely, the ability to follow the preceding vehicle provided by the vehicle speed control executed by the vehicle speed control unit 33 can be enhanced, so that the driver's comfort can be improved.

When the vehicle speed V is low, the occupant is less likely to feel uneasy even if the lateral acceleration G is high and tends to tolerate a larger lateral acceleration G compared to when the vehicle speed V is high. In the present embodiment, the vehicle speed control unit 33 determines the vehicle speed upper limit value Vm based on the prescribed lateral acceleration limit value Gm (Gm1, Gm2), and the lateral acceleration limit value Gm (Gm1, Gm2) is set to a larger value as the radius of curvature R of the lane becomes smaller, as shown in FIG. 5. Thereby, the vehicle speed upper limit value Vm is set based on the lateral acceleration limit value Gm (Gm1, Gm2) that becomes larger as the curvature of the lane acquired by the external environment recognizing unit 31 becomes larger. Therefore, when LKAS is being executed by the steering control unit 32, the vehicle is allowed to turn without excessively lowering the vehicle speed V. Therefore, comfortable and highly convenient vehicle speed control can be performed within the control range tolerable to the occupant.

As shown in FIG. 5, when LKAS is being executed, the vehicle speed control unit 33 sets the lateral acceleration limit value Gm to be small compared to when LKAS is not being executed. Thereby, the ability to follow the lane is improved, and therefore, the occupant can feel easy when the vehicle turns with LKAS executed. When the driver performs the steering operation, the lateral acceleration G is allowed to be larger compared to when LKAS is being executed by the steering control unit 32, whereby increase in the distance to the preceding vehicle due to the limitation of the vehicle speed can be suppressed, namely, the ability to follow the preceding vehicle provided by the vehicle speed control performed by the vehicle speed control unit 33 can be enhanced, so that the driver's comfort can be improved.

When the radius of curvature R of the lane is smaller than the prescribed value Rth, namely, when the curvature of the lane is larger than a prescribed curvature, the lateral acceleration G tends to increase to such an extent that the occupant feels uneasy. In the present embodiment, as shown in FIG. 5, when the radius of curvature R of the lane is smaller than the prescribed value Rth, the vehicle speed control unit 33 sets the LKAS-on lateral acceleration limit value Gm2 to be smaller than the LKAS-off lateral acceleration limit value Gm1. Thereby, the occupant is prevented from feeling uneasy even when the curvature of the lane is larger than or equal to the prescribed curvature.

As described above, the vehicle speed control unit 33 sets the LKAS-on lateral acceleration limit value Gm2 to a value smaller than or equal to 3 m/s$^2$. Thereby, the lateral acceleration G when LKAS is being executed, in which attention of the occupant on the steering operation is relatively low, is maintained not to exceed 3 m/s$^2$, whereby it is ensured that the uneasiness of the occupant caused by the lateral acceleration G can be suppressed.

When the radius of curvature R is larger than or equal to the prescribed value Rth, it is unlikely that the lateral acceleration G to such a degree that the occupant feels uneasy. In the present embodiment, as shown in FIG. 5, when the radius of curvature R of the lane is larger than or equal to the prescribed value Rth, the vehicle speed control unit 33 sets the LKAS-on lateral acceleration limit value Gm2 to the same value as the LKAS-off lateral acceleration limit value Gm1. Therefore, when the curvature is smaller than or equal to the prescribed curvature, it is possible to prevent the vehicle speed V from being excessively lowered, which would deteriorate the convenience and comfort of the vehicle speed control.

Concrete embodiments have been described in the foregoing, but the present invention is not limited to the above embodiments and may be modified or altered in various ways.

For example, when LKAS is being executed, the vehicle speed control unit 33 may set the vehicle speed upper limit value Vm to be higher than when LKAS is not being executed. Thereby, the ability to follow the preceding vehicle when LKAS is being executed can be improved. Also, when the driver performs steering operation, the target vehicle speed Vt is limited by the vehicle speed upper limit value Vm that is lower than when LKAS is being executed by the steering control unit 32, whereby burden on the driver for performing the steering operation is reduced.

Besides, the concrete structure, arrangement, number, etc. of each member or part as well as the concrete content and order of the processes may be appropriately changed within the scope of the present invention. Also, not all of the components shown in the foregoing embodiment are necessarily indispensable and they may be selectively adopted as appropriate.

The invention claimed is:

1. A travel control device for a vehicle, comprising:
   a lane information acquisition unit configured to acquire lane information which is information of a lane on which the vehicle is traveling;
   a steering control unit configured to control steering of the vehicle by executing lane travel control to make the vehicle travel along the lane; and
   a vehicle speed control unit configured to control a vehicle speed by executing constant speed travel control in which the vehicle is made to travel at a set vehicle speed and/or adaptive cruise control in which the vehicle is made to travel at a speed equal to or lower than the set vehicle speed so as to follow a preceding vehicle,
   wherein the vehicle speed control unit is configured to control the vehicle speed during a turn of the vehicle by setting a vehicle speed upper limit value, and
   the vehicle speed upper limit value is set to different values depending on whether the lane travel control is being executed,
   wherein when the lane travel control is being executed, the vehicle speed control unit sets the vehicle speed upper limit value to be lower than when the lane travel control is not being executed,
   wherein the lane information acquisition unit is configured to acquire a curvature of the lane,
   the vehicle speed control unit is configured to determine the vehicle speed upper limit value based on a prescribed lateral acceleration limit value, and
   the lateral acceleration limit value is set to a larger value as the curvature of the lane becomes larger,
   wherein in a case where the curvature of the lane is larger than a prescribed curvature, the vehicle speed control unit sets the lateral acceleration limit value when the lane travel control is being executed to a value smaller than the lateral acceleration limit value when the lane travel control is not being executed,
   wherein in a case where the curvature of the lane is smaller than or equal to the prescribed curvature, the vehicle speed control unit sets the lateral acceleration limit value when the lane travel control is being executed to a value same as the lateral acceleration limit value when the lane travel control is not being executed.

2. The travel control device according to claim 1, wherein the vehicle speed control unit sets the lateral acceleration limit value when the lane travel control is being executed to a value smaller than or equal to 3 m/s$^2$.

3. The travel control device according to claim 1, wherein the lane information acquisition unit is configured to acquire the curvature of the lane from a current position of the vehicle on the lane to a future position where the vehicle will travel, and
   the vehicle speed control unit is configured to limit fluctuation of the vehicle speed upper limit value based on the curvature of the lane at the future position.

4. The travel control device according to claim 3, wherein in a case where the lane travel control that has been executed is stopped while the vehicle is traveling in an increasing curvature section of the lane in which the curvature at the future position is larger than the curvature at the current position, the vehicle speed control unit limits an increase in the vehicle speed upper limit value due to the stopping of the lane travel control.

5. The travel control device according to claim 3, wherein in a case where the lane travel control that has been stopped is started while the vehicle is traveling in a decreasing curvature section of the lane in which the curvature at the future position is smaller than the curvature at the current position, the vehicle speed control unit limits a decrease in the vehicle speed upper limit value due to the starting of the lane travel control.

* * * * *